United States Patent
Reddy et al.

(10) Patent No.: US 10,738,231 B2
(45) Date of Patent: Aug. 11, 2020

(54) SYNERESIS REDUCING COMPOSITIONS FOR CONFORMANCE APPLICATIONS USING METAL CROSS-LINKED GELS

(71) Applicant: Halliburton Energy Services, Inc., Houston, TX (US)

(72) Inventors: B. Raghava Reddy, The Woodlands, TX (US); Larry Steven Eoff, Porter, TX (US); Natalie Lynn Pascarella, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 18 days.

(21) Appl. No.: 15/560,393

(22) PCT Filed: Apr. 22, 2015

(86) PCT No.: PCT/US2015/027133
§ 371 (c)(1),
(2) Date: Sep. 21, 2017

(87) PCT Pub. No.: WO2016/171686
PCT Pub. Date: Oct. 27, 2016

(65) Prior Publication Data
US 2018/0066175 A1     Mar. 8, 2018

(51) Int. Cl.
*C09K 8/512* (2006.01)
*C09K 8/506* (2006.01)
(Continued)

(52) U.S. Cl.
CPC ............. *C09K 8/512* (2013.01); *C09K 8/506* (2013.01); *C09K 8/5086* (2013.01); *E21B 33/138* (2013.01)

(58) Field of Classification Search
None
See application file for complete search history.

(56) References Cited

U.S. PATENT DOCUMENTS 3,762,476 A * 10/1973 Gall .................. C09K 8/887
166/270
4,155,405 A    5/1979 Vio
(Continued)

FOREIGN PATENT DOCUMENTS

IT       001254554 B * 9/1995
WO    2014/028242 A1    2/2014

OTHER PUBLICATIONS

International Preliminary Report on Patentability issued in related PCT Application No. PCT/US2015/027133, dated Nov. 2, 2017, 7 pages.
(Continued)

*Primary Examiner* — William D Hutton, Jr.
*Assistant Examiner* — Charles R Nold
(74) *Attorney, Agent, or Firm* — Thomas Rooney; Baker Botts L.L.P.

(57) ABSTRACT

Methods and compositions that may be used to prevent the water from coming to the surface or otherwise interfering with the production of hydrocarbons are provided. An embodiment of the present disclosure is a method comprising: providing a treatment fluid comprising an aqueous base fluid, a polymer, a metal-based crosslinker, and an amino alkylene phosphonate; and introducing the treatment fluid into a wellbore that penetrates at least a portion of a subterranean formation.

8 Claims, 2 Drawing Sheets

(51) Int. Cl.
*C09K 8/508* (2006.01)
*E21B 33/138* (2006.01)

(56) References Cited

U.S. PATENT DOCUMENTS

| | | | |
|---|---|---|---|
| 4,928,766 A | 5/1990 | Hoskin | |
| 5,028,344 A | 7/1991 | Hoskin | |
| 5,273,115 A | 12/1993 | Spafford | |
| 5,431,226 A | 7/1995 | Sydansk | |
| 5,441,928 A | 8/1995 | Albonico et al. | |
| 7,491,682 B2 * | 2/2009 | Gupta | C09K 8/516 166/270 |
| 7,854,262 B2 | 12/2010 | Santra et al. | |
| 2008/0035339 A1 * | 2/2008 | Welton | C09K 8/524 166/279 |
| 2008/0139412 A1 * | 6/2008 | Fuller | C09K 8/52 507/219 |
| 2011/0017209 A1 * | 1/2011 | Monzyk | A61M 16/10 128/202.26 |
| 2011/0257015 A1 * | 10/2011 | Bergeron | A61K 8/416 504/361 |
| 2015/0107844 A1 * | 4/2015 | Gupta | E21B 43/255 166/308.2 |
| 2017/0226404 A1 * | 8/2017 | Gupta | C09K 8/524 |

OTHER PUBLICATIONS

International Search Report and Written Opinion issued in related PCT Application No. PCT/US2015/027133 dated Jan. 22, 2016, 10 pages.

* cited by examiner

SYNERESIS REDUCING COMPOSITIONS FOR CONFORMANCE APPLICATIONS USING METAL CROSS-LINKED GELS

CROSS-REFERENCE TO RELATED APPLICATION

The present application is a U.S. National Stage Application of International Application No. PCT/US2015/027133 filed Apr. 22, 2015, which is incorporated herein by reference in its entirety for all purposes.

BACKGROUND

The present disclosure relates to systems and methods for treating subterranean formations. In particular, the present disclosure relates to conformance gels or sealants that may be used to prevent the water from coming to the surface or otherwise interfering with the production of hydrocarbons.

Natural resources such as oil or gas residing in a subterranean formation can be recovered by drilling a wellbore that penetrates the formation. As used herein, the term "formation" refers to a region having similar geological characteristics, including the presence of particular formation fluids. The wellbore passes through a variety of subterranean formations. This may include reservoir zones (i.e., formations that contain oil or gas) and non-reservoir zones (i.e., formations that do not contain oil and gas). In some situations, non-reservoir zones may contain water instead of oil and gas.

After the wellbore has been drilled, the well is completed. The completion process includes the steps of preparing the drilled wellbore for the production of hydrocarbons. The completion process may include, for example, inserting production tubing into the wellbore, perforating the production tubing, stimulating the reservoir zones (e.g., acidizing or fracturing), etc. In general, a goal of the completion process may be to fluidly connect the wellbore to the reservoir zones (to allow hydrocarbons, such as oil and gas, to be produced) while isolating the wellbore from the non-reservoir zones (to prevent non-hydrocarbon formation fluids, such as water, from being produced). After a well has been completed, it may produce hydrocarbons for a period of months or even years.

While a well remains in production, the formation fluids in the reservoir zones may change over time. For example, the permeability of various zones in the formation may vary considerably. Over time, the hydrocarbon may be produced from higher permeability zones sooner than from lower permeability zones, and the high permeability zones may then begin to produce water. If a well begins producing water, it may be remediated by sealing off the water-producing zones. One way to remediate a water-producing well involves pumping a polymer gel down the wellbore into the water-producing zone. The gel seals the water-producing zone, creating a barrier that prevents the water in the formation from flowing into the wellbore. The remaining hydrocarbon-producing zones continue to produce oil and gas that can be recovered from the well.

The polymer gels may include an additional crosslinking agent, such as a metal crosslinker, that increases the strength of the gel by causing the polymer chains to crosslink together. The increased gel strength generally allows the gel to function more effectively and last longer. However, in certain circumstances, the crosslinking agent may cause the gel to over-crosslink. Over-crosslinking essentially causes the gel to collapse on itself and squeeze water out of the gel. This loss of water is known as syneresis and causes the volume of the gel to shrink. As the gel shrinks, it loses its ability to seal the water-producing zone and may even be washed out of the well.

BRIEF DESCRIPTION OF THE DRAWINGS

These drawings illustrate certain aspects of some of the embodiments of the present disclosure, and should not be used to limit or define the claims.

Figure 1:
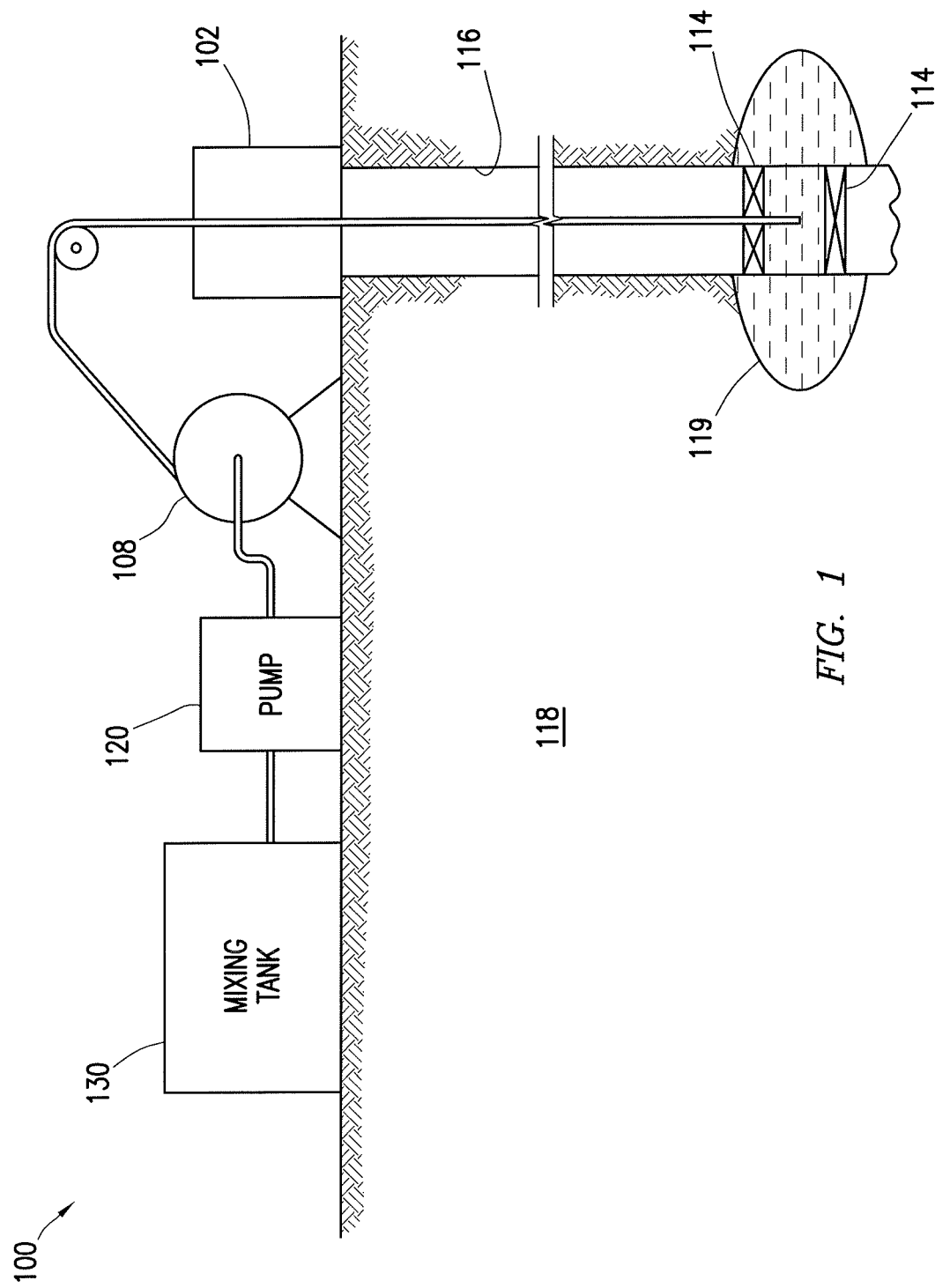
FIG. 1 is a diagram illustrating an example of a system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating subterranean formations. In particular, the present disclosure relates to conformance gels or sealants that may be used to prevent the water from coming to the surface or otherwise interfering with the production of hydrocarbons.

Generally speaking, the present disclosure provides methods and systems for sealing water-producing zones in a subterranean formation that is penetrated by a wellbore. The techniques of the present disclosure involve introducing a treatment fluid into the water-producing or gas-producing zone. The treatment fluid generally comprises a base fluid, a polymer, a metal-based crosslinker, and an amino alkylene phosphonate. According to certain methods of the present disclosure, the treatment fluid infiltrates the permeable portions of the water-producing zones and forms a physical barrier that substantially prevents water from entering the wellbore or being produced to the surface. This may facilitate the ongoing production of hydrocarbons from other zones. In some embodiments, the methods and systems of the present disclosure can be used to seal a gas-producing zone.

In certain embodiments, the treatment fluid may form a gel. As used herein, the term "gel" refers to a fluid with a viscosity greater than about 10,000 cP. In certain embodiments, the gel has a viscosity greater than about 1,000,000 cP. In some embodiments, the treatment fluid has a relatively low viscosity while it is being introduced into the water-producing or gas-producing zone, and the treatment fluid viscosities and forms a gel after it has been placed in the water-producing or gas producing zone. In other embodiments, the treatment fluid may have a relatively high viscosity while it is being introduced into the water-producing or gas-producing zone.

Without limiting the disclosure to any particular theory or mechanism, it is believed that the amino alkylene phosphonates are effective at reducing the fluid loss and shrinkage that can affect an over-crosslinked gel. Crosslinked gels are susceptible to syneresis, a process where the gel shrinks and expels water as the result of over-crosslinking. Where the gel is being used to seal off a zone of the well, syneresis can lead to a loss of the seal, which is particularly detrimental in high permeability zones because the generated free water can be easily swept by a subsequent fluid, reestablishing flow channels. It is believed that the introduction of amino alkylene phosphonates modifies the metal-based crosslinker structure, reducing the likelihood of over-crosslinking and the consequential syneresis.

Among the many potential advantages to the methods and compositions of the present disclosure, only some of which are alluded to herein, the methods, compositions, and systems of the present disclosure may facilitate the remediation of a well by providing improved compositions and methods to seal water-producing or gas-producing zones. Crosslinked gels are often necessary to provide sufficient structural integrity, but this should be balanced against the risk of over-crosslinking and syneresis.

The treatment fluid used in the methods and compositions of the present disclosure may comprise any aqueous base fluid known in the art. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods and compositions of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate.

The polymer used in the methods, compositions, and systems of the present disclosure may comprise any polymer capable of crosslinking with a metal-based crosslinker and forming a gel. The polymer may be naturally-occurring or synthetic, and may by hydratable in water or other aqueous fluids. In some certain embodiments, the polymer contains a carboxylic acid group. Examples of suitable polymers include, but are not limited to, hydrolyzed polyacrylamide, partially hydrolyzed polyacrylamide, and copolymers of acrylamide or acrylic acid with 2-acrylamido-2-methyl propane sulfonic acid, N,N-dimethylacrylamide, vinyl pyrrolidone, dimethylaminoethyl methacrylate, dimethylaminopropylmethacrylamide, trimethylammoniumethyl methacrylate chloride, methacrylamide, hydroxyethyl acrylate, vinyl amine, vinyl acetate, and combinations thereof. In certain embodiments, the polymer may have a molecular weight between about 0.2 million to about 15 million. Polymers with a relatively high molecular weight (e.g., from about 10 million to about 15 million) may be useful in embodiments where the treatment fluid is used to treat a subterranean formation that has been fractured. Without being limited by theory, it is believed that polymers with a relatively high molecular weight tend to stay in the open space of the fracture and may be more resistant to moving into the matrix.

The concentration of the polymer in the treatment fluid may vary depending on the circumstances. For example, polymers with relatively higher molecular weights may be used at relatively lower concentrations. Without being limited by theory, it is believed that polymers with higher molecular weights produce a gel with favorable characteristics because of the degree of crosslinking. In contrast, polymers with relatively lower molecular weights may require higher concentrations to produce a gel. In some embodiments, the polymer may be present in the treatment fluid in a concentration of about 500 parts per million to about 100,000 parts per million. In other embodiments, the polymer may be present in the treatment fluid in a concentration of about 1,000 parts per million to about 50,000 parts per million. In other embodiments, the polymer may be present in the treatment fluid in a concentration of about 2,000 parts per million to about 10,000 parts per million.

The metal-based crosslinker used in the methods, compositions, and systems of the present disclosure may comprise any suitable metallic salt. In some certain embodiments, the metal-based crosslinker is capable of coordinating with a carboxylic acid group. Examples of suitable metals include, but are not limited to, chromium, aluminum, zirconium, iron, and combinations thereof. In some embodiments, the metal-based crosslinker comprises a Cr(3+) salt. In certain embodiments, the metal-based crosslinker comprises Cr(3+) propionate or Cr(3+) acetate. In some embodiments, the ratio of the metal-based crosslinker to the polymer may be in a range of about 1:500 to about 1:1. In other embodiments, the ratio of the metal-based crosslinker to the polymer may be in a range of about 1:54 to about 1:29.

The amino alkylene phosphonates suitable for use in the methods, compositions, and systems of the present disclosure may comprise any organic molecule having at least one amino functional group and at least one phosphonate functional group. In certain embodiments, the amino alkylene phosphonate may be present in an acid form (e.g., a phosphonic acid). In other embodiments, the amino alkylene phosphonate may be present as a salt of a phosphonic acid. In certain embodiments, the amino alkylene phosphonate may comprise at least 2 amino groups and at least 3 phosphonate groups. In other embodiments, the amino alkylene phosphonate may comprise at least 3 amino groups and at least 3 phosphonate groups. In certain embodiments, the amino alkylene phosphonate may take the form $R_2N-(CH_2)_X-NR_2$, where X is an integer from 2 to 6, at least three of the R groups are $-CH_2-PO_3H_2$, and the remaining R groups are $-H$. In other embodiments, the amino alkylene phosphonate may take the form $R_2N-(CH_2)_X-(NR)-(CH_2)_X-NR_2$, where X is an integer from 2 to 6, at least three of the R groups are $-CH_2-PO_3H_2$, and the remaining R groups are $-H$.

Examples of suitable amino alkylene phosphonic acids are commercially available under the trade names DEQUEST® phosphonate (available from Italmatch Chemicals) and MICROMATRIX® cement retarder and FDP C754-04 (both available from Halliburton Energy Services). Depending on the chemical composition, various DEQUEST® materials are available under different series such as Series 2000, Series 2010, Series 2060, Series 2080, Series 2090, Series 6000 and Series 7000. They differ in the amino alkylene group that carries the phosphonate group, and the degree of neutralization.

In some embodiments, the amino alkylene phosphonate may be present in the treatment fluid in a concentration of about 0.01% by weight to about 1.0% by weight. In other embodiments, the amino alkylene phosphonate may be present in the treatment fluid in a concentration of about 0.03% by weight to about 0.5% by weight. In other embodiments, the amino alkylene phosphonate may be present in the treatment fluid in a concentration of about 0.06% by weight to about 0.2% by weight.

Without being limited by theory, it is believed that the amino alkylene phosphonate coordinates with the metal-based crosslinker. This may prevent the polymer from over-crosslinking which can otherwise lead to syneresis and the loss of gel volume. A person of skill in the art, with the benefit of this disclosure, would be able to determine the concentration of amino alkylene phosphonate that is appropriate for a particular type and concentration of the metal-based crosslinker.

In certain embodiments, the treatment fluid may further comprise an inverting surfactant. Suitable inverting surfactants include, but are not limited to, $C_8$-$C_{30}$ alcohol ethoxylates having at least about 5 ethylene oxide units, wherein the $C_8$-$C_{30}$ may comprise a linear alkyl chain, a branched alkyl chain, an internal aryl group, and the like (e.g., branched polyoxyethylene (5) nonylphenylether (available as IGEPAL® CO-520 from Sigma-Aldrich), polyoxyethylene (10) cetyl ether (available as BRIJ®C10 from Sigma-Aldrich), polyoxyethylene (20) stearyl ether (available as BRIJ®S20 from Sigma-Aldrich), polyoxyethylene (100) stearyl ether (available as BRIJ®100 from Sigma-Aldrich), and polyoxyethylene (150) dinonylphenyl ether (available as IGEPAL® DM-970 from Sigma-Aldrich)); block copolymers of polyethylene and polyethylene glycol; block copolymers of polypropylene glycol and polyethylene glycol; polyethylene glycol sorbitans (e.g., polyethylene glycol sorbitan monolaurate (commercially available as TWEEN®20 from Sigma-Aldrich), poly ethylene glycol sorbitan monostearate (commercially available as TWEEN®60 from Sigma-Aldrich), polyethylene glycol sorbitan tetraoleate, and polyethylene glycol sorbitan monopalmitate (commercially available as TWEEN®40 from Sigma-Aldrich)); sulfate surfactants (e.g., sodium lauryl sulfate); sulfonate surfactants; phosphate surfactants; carboxylate surfactants; secondary amine surfactants; tertiary amine surfactants; quaternary ammonium surfactants (e.g., cetylpyridinium chloride, benzalkonium chloride, and dioctadecyldimethylammonium bromide); and the like, any derivative thereof, and any combination thereof An inverting surfactant accelerates the hydration time of an inverse emulsion polymer in the aqueous base fluid. The use of the inverting surfactant may facilitate the preparation of the treatment fluid by dispersing the polymer.

In certain embodiments, the treatment fluids used in the methods and compositions of the present disclosure optionally may comprise any number of additional additives. Examples of such additional additives include, but are not limited to, salts, surfactants, acids, diverting agents, fluid loss control additives, gas, nitrogen, carbon dioxide, surface modifying agents, foamers, corrosion inhibitors, catalysts, clay control agents, biocides, friction reducers, antifoam agents, bridging agents, $H_2S$ scavengers, $CO_2$ scavengers, oxygen scavengers, lubricants, additional viscosifiers, breakers, weighting agents, relative permeability modifiers, wetting agents, filter cake removal agents, antifreeze agents (e.g., ethylene glycol), and the like. A person skilled in the art, with the benefit of this disclosure, will recognize the types of additives that may be included in the treatment fluids of the present disclosure for a particular application.

The present disclosure in some embodiments provides methods for using the treatment fluids to carry out a variety of subterranean treatments, including but not limited to, remediating wells and/or subterranean formations. In certain embodiments, a treatment fluid may be introduced into a subterranean formation. In some embodiments, the treatment fluid may be introduced into a well bore that penetrates a subterranean formation. In some embodiments, the treatment fluids of the present disclosure may be used in remediating a portion of a well and/or subterranean formation, for example, in sealing off a water-producing zone of the subterranean formation from the well. In these embodiments, the treatment fluid forms a physical barrier that prevents water from the water-producing zones from entering the wellbore.

In some embodiments, the treatment fluid of the present disclosure is used to remediate a well that has begun producing water. This usually occurs after the well has been completed and production has begun. In an embodiment, the method of remediating the well takes place in a well that has been cased, but the method may be performed in a cased or an uncased section of the well. In certain embodiments, the purpose of the remediation treatment is to fix the well after it starts producing water so that it produces hydrocarbons again.

In one embodiment, the following steps may be used to remediate a well using the treatment fluid of the present disclosure. First, the location of the water-producing zone of the well is determined using methods known in the art. Second, the water-producing zone of the well is isolated. This can be accomplished by any technique known in the art including, but not limited to, the use of coiled tubing and/or packers. Third, the treatment fluid of the present disclosure is pumped into the water-producing zone. In certain embodiments, the treatment fluid may be pumped through the coiled tubing used to set the packer. Fourth, after the treatment fluid has set in place (e.g., formed a gel) in the water-producing zone of the well, the packers (or other isolation devices) are removed from the well. Finally, hydrocarbon production is resumed.

In some embodiments, the treatment fluid of the present disclosure may be used to seal off a gas-producing zone. In these embodiments, the treatment fluid may be used when it is intended for the well to produce liquid hydrocarbons but the well has begun producing gas instead. Generally, the method of treating a gas-producing zone is similar to the method of treating a water-producing zone. First, the location of the gas-producing zone of the well is determined. Second, the gas-producing zone of the well is isolated. Third, the treatment fluid of the present disclosure is pumped into the gas-producing zone. Fourth, after the treatment fluid has set in place in the gas-producing zone of the well, the packers (or other isolation devices) are removed from the well. Finally, production is resumed.

The examples of treatment fluids disclosed herein may directly or indirectly affect one or more components or pieces of equipment associated with the preparation, delivery, recapture, recycling, reuse, and/or disposal of the disclosed treatment fluids. For example, and with reference to FIG. 1, the disclosed treatment fluids may directly or indirectly affect one or more components or pieces of equipment associated with an exemplary assembly 100, according to one or more embodiments. It should be noted that while FIG. 1 generally depicts a land-based assembly, those skilled in the art will readily recognize that the principles described herein are equally applicable to subsea operations that employ floating or sea-based platforms and rigs, without departing from the scope of the disclosure.

As illustrated, the assembly 100 may include a wellhead 102 placed above a wellbore 116 that penetrates various subterranean formations 118. The wellbore 116 may be cased or uncased. If the wellbore 116 has been cased, then the casing will typically be perforated at one or more locations in the subterranean formation 118. The subterranean formations 118 may include one or more water-producing zones 119. The assembly may also include coiled tubing 108, a pump 120, and a mixing tank 130. The mixing tank 130 may include, but is not limited to, mixers and related mixing equipment known to those skilled in the art.

In operation, the coiled tubing 108 may be used to place packers 114 above and below a zone that is desired to be treated, such as water-producing zone 119. The packers 114 serve to isolate the water-producing zone 119 for treatment. A treatment fluid according to the present disclosure may be prepared at the surface in the mixing tank 130. The pump 120 introduces the treatment fluid through the coil tubing 108 into the isolated water-producing zone 119. After the treatment fluid has been introduced into the water-producing zone 119, the packers 114 may be removed and the coil tubing retracted from the wellbore 116. The treatment fluid remains and seals the water-producing zone 119.

As mentioned above, the disclosed treatment fluid may directly or indirectly affect the components and equipment of the assembly 100. For example, the disclosed treatment fluid may directly or indirectly affect the mixing tank 130. The mixing tank 130 may further include one or more sensors, gauges, pumps, compressors, and the like used store, monitor, regulate, and/or recondition the exemplary treatment fluid. The disclosed treatment fluid may directly or indirectly affect the pump 120, which representatively includes any conduits, pipelines, trucks, tubulars, and/or pipes used to fluidically convey the treatment fluid downhole, any pumps, compressors, or motors (e.g., topside or downhole) used to drive the treatment fluid into motion, any valves or related joints used to regulate the pressure or flow rate of the treatment fluid, and any sensors (i.e., pressure, temperature, flow rate, etc.), gauges, and/or combinations thereof, and the like.

While not specifically illustrated herein, the disclosed treatment fluid may also directly or indirectly affect any transport or delivery equipment used to convey the treatment fluid to the assembly 100 such as, for example, any transport vessels, conduits, pipelines, trucks, tubulars, and/or pipes used to fluidically move the treatment fluid from one location to another, any pumps, compressors, or motors used to drive the treatment fluid into motion, any valves or related joints used to regulate the pressure or flow rate of the treatment fluid, and any sensors (i.e., pressure and temperature), gauges, and/or combinations thereof, and the like.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Example 1

A hydrolyzed polyacrylamide (HPAM) emulsion was added to synthetic seawater containing PEN 5M surfactant (to facilitate inversion of the emulsion and hydrate the polymer), and agitated for 30 minutes for hydration to complete. To 50 ml of this solution, 0.725 gal/Mgal chromium crosslinker solution was added and stirred. The resulting blue solution was kept in a water bath at 140° F. Periodically, the amount of free water that separated was measured. Brookfield viscometers were used for measuring gel times.

The results in Table 1 (below) show that in about 2 days, the amount of free water generated can be as high as 22-26% increasing to 45% in 3 days. Decreasing the crosslinker amounts reduced the syneresis but it also led to weak gels which may not be resistant to flooding fluid pressure.

TABLE 1

Syneresis of Cr(+3)-propionate crosslinked HPAM gels in synthetic seawater at 140° F.

| Example | Polymer Conc., ppm | Cr (3+) amount, ppm | Syneresis (2 days) | Syneresis (3 days) | Gel quality |
|---|---|---|---|---|---|
| 1 | 7000 | 240 | 22% | 45% | Blue gel ball floats in free water @ 3 days |
| 2 | 7000 | 190 | 4% (weak gel) | 7% (weak gel) | Weak gel |
| 3 | 7000 | 130 | 1% (weak gel) | (very weak flowing gel) | Difficult to measure free water - Very weak gel |
| 4 | 12000 | 400 | 26% | 33% (56% @ 12 days) | Blue gel ball floating in free water |

Example 2

A variety of compounds were tested with the goal of blocking coordination sites on the chromium ions to prevent over-crosslinking the HPAM carboxylate groups. When these potential syneresis-controlling materials were used tested, they were added to the hydrated polymer solution prior to the addition of the crosslinker.

First, different carboxylate-based or carboxylate-generating ligands were tested but failed with no sign of decreased syneresis. Examples of carboxylate-based or carboxylated-generating materials included polyacrylic acid and its salts, polyaspartic acid, polysuccinimide, pectin, citric acid and its salts, amino polycarboxylic acids such as iminodisuccinic acid, TRILON® M chelating agent (available from BASF), and glycine. Second, phenol-containing compounds were tested with a similar lack of success. Finally, sulfur-containing acids such as sulfamic acid also failed to provide synereseis prevention.

Example 3

Figures 2A, 2B:
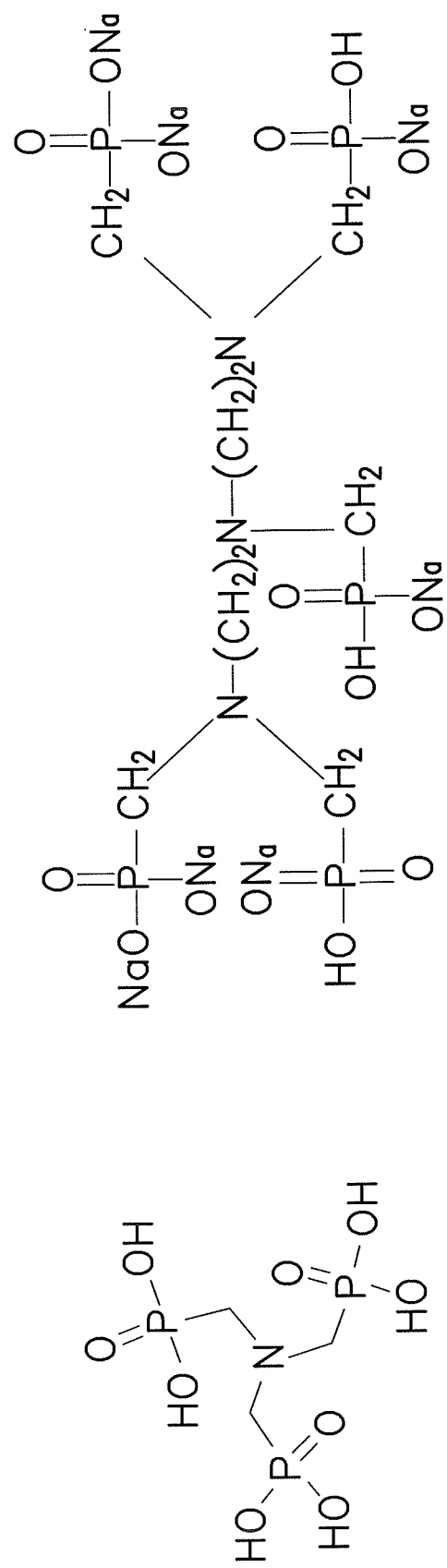
FIG. 2 is a diagram illustrating two examples of the structures of amino alkylene phosphonates that may be used in accordance with certain embodiments of the present disclosure. DEQUEST® 2000 is shown in FIG. 2a and DEQUEST® 2066 is shown in FIG. 2b.

It has been found that amino alkylene phosphonic acids and their salts are effective in preventing syneresis of Cr(3+)-HPAM gels. The molecular structures of two examples of DEQUEST® materials are shown in FIG. 2. DEQUEST® 2000 is shown in FIG. 2a and DEQUEST® 2066 is shown in FIG. 2b. MICROMATRIX® cement retarder corresponds to a diluted DEQUEST® 2000 and the activity (concentration) of the phosphonate, at 25% in the acid form. DEQUEST® 2006 and FDP C754-04 correspond to the completely neutralized sodium salt of DEQUEST® 2000. The active content of the phosphate is at 40%.

DEQUEST® 2066, the structure of which is shown in FIG. 2, is the heptasodium salt (partially neutralized) of DEQUEST® 2060 series containing diethylene triamine as the central amino unit.

The same test described in Example 1 was performed on a Cr(+3)-propionate crosslinked HPAM in the presence of MICROMATRIX® cement retarder. The syneresis results are shown in Table 2 below.

TABLE 2

Syneresis of Cr(+3)-propionate crosslinked HPAM in the presence of MICROMATRIX ® cement retarder in synthetic seawater at 140° F.

| Example | Polymer Conc., ppm | Cr (3+) amount, ppm | MICROMATRIX ® cement retarder Wt % | Syneresis Value (7 days) |
|---|---|---|---|---|
| 5 | 7000 | 240 | None | 43% |
| 6 | 7000 | 240 | 0.0115 | 2.9% |

The results show that the amount of syneresis at the end of seven days is reduced from 43% to 2.9% by adding MICROMATRIX® cement retarder.

The same test described in Example 1 was performed on a Cr(+3)-propionate crosslinked HPAM in the presence of DEQUEST® 2006 (the sodium salt of DEQUEST® 2000). The syneresis results are shown in Table 3 below. The syneresis values reported in Table 3 and comparison with those in Table 2 suggest that the amino alkylene phosphonates provide very effective control of gel syneresis irrespective of whether they are in acid form or salt form. It is observed, however, that increasing amounts of amino alkylene phosphonates caused formation of weaker gels in these tests.

TABLE 3

Syneresis of Cr(+3)-propionate crosslinked HPAM gels in the presence of DEQUEST ® 2006 in synthetic seawater at 140° F.

| Example | Polymer Conc., ppm | Cr (3+) amount, ppm | DEQUEST ® 2006 Wt % | Syneresis Value (1 day) | Syneresis Value (14 days) |
|---|---|---|---|---|---|
| 7 | 7000 | 240 | 0.06 | 3.0% | 2% |
| 8 | 7000 | 240 | 0.12 | 4.5% | 5% |
| 9 | 7000 | 240 | 0.18 | 2.2% | n.d. |

Effects of neutralized form of amino alkylene phosphonic acid, MMCR, on gel times was tested with DEQUEST® 2006.

Effects of partially neutralized form of amino alkylene phosphonate containing greater number of phosphonate and amine nitrogens on the syneresis and gel times was tested with a DEQUEST® 2066 containing three tertiary nitrogens and five phosphonate groups according to the same method described in Example 1. The results are shown in Table 4 below.

TABLE 4

Syneresis of Cr(+3)-propionate crosslinked HPAM in the presence of diluted DEQUEST ® 2066 in synthetic seawater at 140° F.

| Example | Polymer Conc., ppm | Cr (3+) amount, ppm | DEQUEST ® 2066 Wt % | Syneresis Value (6 days) | Syneresis Value (12 days) |
|---|---|---|---|---|---|
| 10 | 7000 | 240 | 0.06 | 2.8% @ 6 days | 2% @ 12 days |
| 11 | 7000 | 240 | 0.12 | 4% @ 6 days | 5% @ 12 days |
| 12 | 7000 | 240 | 0.18 | 0.8% @ 6 days | 6% @ 12 days |

The results in Table 4 indicate that although the syneresis prevention is comparable to DEQUEST® 2006, the gel times were not accelerated as seen for DEQUEST® 2006.

An embodiment of the present disclosure is a method comprising: providing a treatment fluid comprising an aqueous base fluid, a polymer, a metal-based crosslinker, and an amino alkylene phosphonate; and introducing the treatment fluid into a wellbore that penetrates at least a portion of a subterranean formation. Optionally, the wellbore is a completed well. Optionally, the subterranean formation comprises a water-producing zone. Optionally, the method further comprises placing the treatment fluid in the water-producing zone. Optionally, the polymer comprises a polyacrylamide. Optionally, the crosslinker comprises a salt of Cr(3+). Optionally, the amino alkylene phosphonate comprises at least 2 amino groups and at least 3 phosphonate groups. Optionally, the treatment fluid is introduced in the wellbore using one or more pumps.

Another embodiment of the present disclosure is a method comprising: providing a treatment fluid comprising an aqueous base fluid, a polymer, a metal-based crosslinker, and an amino alkylene phosphonate; introducing the treatment fluid into a well that penetrates at least a portion of a water-producing zone; and sealing the water-producing zone, such that substantially no water from the water-producing zone is produced by the well. Optionally, the polymer comprises a polyacrylamide. Optionally, the crosslinker comprises a salt of Cr(3+). Optionally, the amino alkylene phosphonate is present in the treatment fluid in a concentration of from about 0.01% by weight to about 1.0% by weight. Optionally, the amino alkylene phosphonate comprises at least 2 amino groups and at least 3 phosphonate groups. Optionally, the treatment fluid is introduced in the completed well using one or more pumps.

Another embodiment of the present disclosure is a composition comprising: an aqueous base fluid, a polymer, a metal-based crosslinker, and an amino alkylene phosphonate. Optionally, the polymer comprises a polyacrylamide. Optionally, the crosslinker comprises a salt of Cr(3+). Optionally, the amino alkylene phosphonate is present in the treatment fluid in a concentration of from about 0.01% by weight to about 1.0% by weight. Optionally, the amino alkylene phosphonate comprises at least 2 amino groups and at least 3 phosphonate groups. Optionally, the composition further comprises an inverting surfactant.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method for sealing a water producing zone in a subterranean formation comprising:
    providing a treatment fluid comprising an aqueous base fluid, a crosslinkable polymer comprising a polyacrylamide, a metal-based crosslinker comprising a salt of Cr(3+), and an amino alkylene phosphonate;
    wherein the amino alkylene phosphonate is present in the treatment fluid in a concentration of from about 0.01% by weight to about 1.0% by weight;
    introducing the treatment fluid into a wellbore that penetrates at least a portion of the subterranean formation;
    allowing the treatment fluid to form a crosslinked polymer gel before or after introducing the treatment fluid into the wellbore and
    sealing the water-producing zone, such that substantially no water from the water-producing zone is produced by the well.

2. The method of claim 1 wherein the wellbore is a completed well.

3. The method of claim 1 wherein the amino alkylene phosphonate comprises at least 2 amino groups and at least 3 phosphonate groups.

4. The method of claim 1 wherein the treatment fluid is introduced in the wellbore using one or more pumps.

5. An aqueous sellable composition capable of producing gels resistant to syneresis in the presence of trivalent ions, comprising:
    a polymer gel comprising:
        an aqueous base fluid,
        a polyacrylamide polymer,
        a metal-based crosslinker comprising a salt of Cr(3+), and
        an amino alkylene phosphonate,
    wherein the amino alkylene phosphonate is present in the sellable composition in a concentration of from about 0.01% by weight to about 1.0% by weight.

6. The composition of claim 5 wherein the amino alkylene phosphonate comprises at least 2 amino groups and at least 3 phosphonate groups.

7. The composition of claim 5 further comprising an inverting surfactant.

8. The method of claim 1, wherein the treatment fluid further comprises an inverting surfactant.

* * * * *